Figures 1, 2:
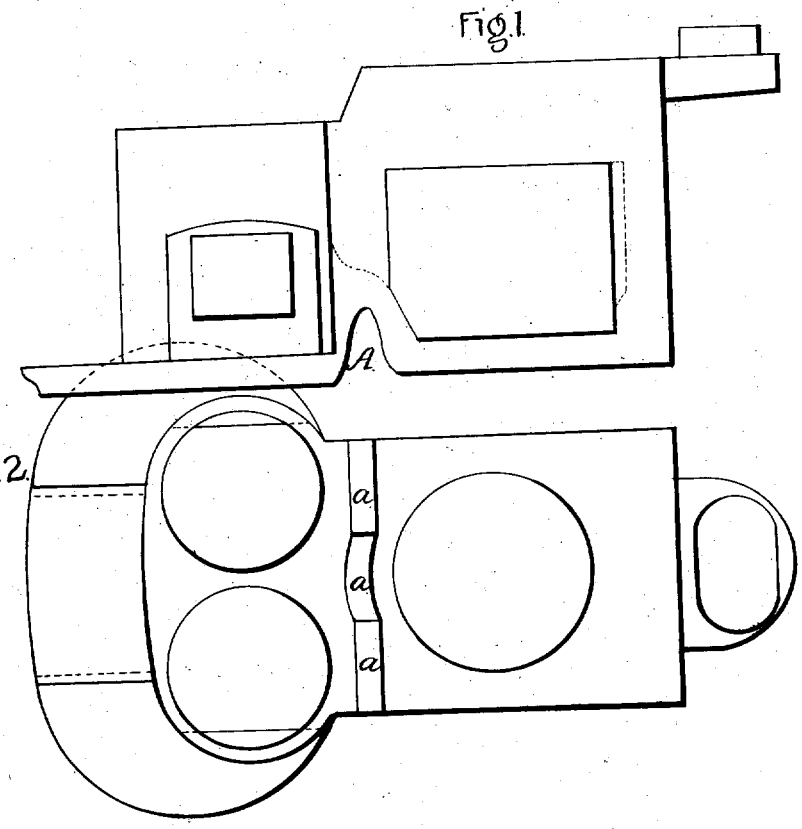

8602X

S. Parker,

Cook Stove.

Patented Jan. 16. 1835.

8602X    Jan. 16. 1835    57

Sylvester Parker    Jan 16, 1835

The Schedule referred to in these Letters Patent and mak-
ing part of the same containing a description in the
words of the said Sylvester Parker himself of his im-
provement in the stove commonly known as the
three-Boiler-flat- Cooking Stove To all to Whom these Presents shall come
greeting. Be it known that I Sylvester Par-
ker of Troy in the County of Rensellaer and
State of New York have invented a new and useful im-
provement in the Stove commonly known as the
three-Boiler-flat- Cooking Stove and that the fol-
lowing is a full and exact description of the construc-
tion and operation of said improvement as inven-
ted by me. The stove upon which I have made
the improvement hereinafter described is the stove
commonly known and described as the three boiler
flat Cooking stove or Jews harp stove. This
stove is constructed with a flat bottom plate or foun-
dation, running the whole length of the stove upon
which is placed in front an apartment for the grate
called the fire Chamber, which contains the fuel
(having in the top two holes for receiving boilers) and
in the rear an apartment for the oven, over which
is another aperture for receiving a boiler. the back
of the apartment which contains the fuel is formed of
an iron plate upon which (together with the grate)
the fuel rests and with which it comes in contact.
The flue of the furnace passes out under this plate at
the bottom of the chamber for fuel, and is then continued
up between the other side of this plate and the front side
of the oven plate which is attached to the furnace in the
rear and forms part of the main body of the stove, and
thence thence over the top of the oven, or the flue may pass out a long the bottom of the Stove under the oven to the back; or it may pass both ways and be regulated by a valve as is commonly the case. The objections to the Stove constructed in this manner arise from the fire acting at the same time upon both sides of the plate forming the back of the furnace and also acting directly upon and coming in contact with the plate which forms the front of the Oven & which very soon destroys these plates, so as to render the Stove unfit for use — My improvement is intended to remedy this evil.

This is effected first, by an alteration in the shape of the plate which forms the bottom or foundation of the Stove. In that part of this plate which is between the furnace and the oven, a curve or bend inwards is made (as seen at A. fig 1) in the drawing annexed which bend is carried upward and extended into the space between the oven and the furnace in such a manner that the fore or front side of the bend forms that part of the back of the furnace which is beneath the flue and upon which the fuel in combustion rests, and which sustains the direct action of the fire. The depth of this curve or bend should ^rise^ to from one quarter to one third the height of the fire chamber.

This curve or bend thus separates the front plate of the oven from the fuel in combustion, as seen in the drawing annexed at a.a.a. Fig. 2. thereby preventing it from being unduly heated and injured as is the case in the common stove, and the open space as seen in the drawing at A. Fig 1. included in the bend or curve admitting a free circulation of air to that part of it on the out side which forms the back of the furnace, thereby protecting that from undue heat and consequen-

86027 sequent destruction from the fire. In these stoves the heat is conducted either through a flue passing from the lower part of the furnace upward over the bend and again downward under the oven and thence to the pipe, or it may - conducted through a flue at the top of the furnace so as to pass over the oven and under the boiler in the top of the stove. these different passages being regulated by a valve in the ordinary manner. To prevent the undue heating of the plate which forms the upper part of the back of the furnace a space or chamber is left between this plate and the front plate of the oven which chamber is a distinct apartment and is supplied with air from small apertures in the sides. The access of the air into this chamber prevents the undue heating and consequent destruction of the upper plate of the back of the furnace and it also separates the front of the oven from the direct action of the fire. What I claim as my invention and improvement in the above described stove is the mode of separating the furnace from the oven by the bend or upward curve in the bottom plate of the stove as above described so as that part of the back of the plate which is exposed to the action of the fire on one side may be open to the air on the other thereby preventing undue heat and the consequent injury and destruction of the plate and also preventing the front plate of the oven from coming in direct contact with the fire, as is the case in stoves of the ordinary construction, thereby preventing the undue heating and consequent injury of the oven. In testimony that the above is a true specification of my said improvement as above described, I have hereunto set my hand at the City of New York this 12th day of December in the the year of our Lord one thousand eight hundred (and thir
ty four Witnesses Jno. B. P. B. Stiles Geo. A. Sherman Sylvester Parker (Drawings)

(1100 words)